(12) United States Patent
Nelles et al.

(10) Patent No.: US 10,278,360 B2
(45) Date of Patent: May 7, 2019

(54) SINGLE AUGER EXTRUDER

(71) Applicant: Tetra Laval Holdings & Finance S.A., Pully (CH)

(72) Inventors: Peter F. Nelles, Blue Mounds, WI (US); Gary L. Nesheim, Delafield, WI (US); Grant L. Nesheim, Mazomanie, WI (US)

(73) Assignee: Tetra Laval Holdings & Finance S.A., Pully (CH)

( * ) Notice: Subject to any disclaimer, the term of this patent is extended or adjusted under 35 U.S.C. 154(b) by 270 days.

(21) Appl. No.: 15/050,099

(22) Filed: Feb. 22, 2016

(65) Prior Publication Data

US 2016/0243727 A1 Aug. 25, 2016

Related U.S. Application Data

(60) Provisional application No. 62/118,981, filed on Feb. 20, 2015.

(51) Int. Cl.
| | | |
|---|---|---|
| *B29B 7/40* | (2006.01) |
| *A01J 25/00* | (2006.01) |
| *B29C 47/66* | (2006.01) |
| *B29C 47/08* | (2006.01) |
| *A23C 19/068* | (2006.01) |
| *B29C 47/38* | (2006.01) |

(52) U.S. Cl.
CPC ............ *A01J 25/00* (2013.01); *A01J 25/008* (2013.01); *B29C 47/0847* (2013.01); *B29C 47/0849* (2013.01); *B29C 47/666* (2013.01); *A23C 19/0684* (2013.01); *B29C 47/385* (2013.01)

(58) Field of Classification Search
CPC .......... A01J 25/12; A01J 25/00; A01J 25/008; B02C 7/17; B02C 7/22; B29C 47/66; B29C 47/666; B29C 47/822; B29B 7/402; B01F 15/00837; B01F 15/00883; B01F 15/00889; B01F 15/00844
USPC ...................................................... 366/307
See application file for complete search history.

(56) References Cited

U.S. PATENT DOCUMENTS

| | | | |
|---|---|---|---|
| 140,527 A * | 7/1873 | Munson, Jr. .............. | B65F 1/02 220/622 |
| 923,047 A | 5/1909 | Hanna | |
| 1,639,828 A | 8/1927 | Wheeler et al. | |
| 1,713,537 A | 5/1929 | Kux | |
| 1,796,445 A | 3/1931 | Doering et al. | |
| 1,861,721 A | 6/1932 | Scott | |
| 2,321,185 A | 6/1943 | Christian | |
| 2,733,148 A | 1/1956 | Russo | |

(Continued)

FOREIGN PATENT DOCUMENTS

| | | |
|---|---|---|
| EP | 0124163 | 11/1984 |
| EP | 0186795 | 7/1986 |

(Continued)

*Primary Examiner* — Tony G Soohoo
*Assistant Examiner* — Elizabeth Insler
(74) *Attorney, Agent, or Firm* — Knobbe, Martens, Olson & Bear, LLP

(57) ABSTRACT

The disclosure relates to methods and apparatuses for the production of cheese. In one embodiment, the disclosure relates to methods and apparatuses for making pasta filata cheese. In one embodiment, the disclosure relates to a barrel for a single auger extrude having angular sections of material.

11 Claims, 17 Drawing Sheets

(56) References Cited

U.S. PATENT DOCUMENTS

| | | |
|---|---|---|
| 2,781,269 A | 2/1957 | Harper et al. |
| 2,840,909 A | 7/1958 | Dzenis |
| 2,883,163 A | 4/1959 | Solheim |
| 2,908,575 A | 10/1959 | Spiess, Jr. et al. |
| 3,065,502 A * | 11/1962 | Lorenian ............... B29C 47/02 425/113 |
| 3,310,836 A | 3/1967 | Nichols |
| 3,394,011 A | 7/1968 | Richardson et al. |
| 3,529,661 A | 9/1970 | Yousch |
| 3,529,939 A | 9/1970 | Mason |
| 3,548,926 A | 12/1970 | Archer |
| 3,616,747 A | 11/1971 | Lapeyre |
| 3,637,069 A | 1/1972 | Christian et al. |
| 3,688,837 A | 9/1972 | Ocker |
| 3,713,220 A | 1/1973 | Kielsmeier et al. |
| 3,899,596 A | 8/1975 | Stenee |
| 3,961,077 A | 6/1976 | Kielsmeier |
| 3,970,113 A * | 7/1976 | Guttinger ............ B29C 47/0847 138/157 |
| 4,039,691 A | 8/1977 | Hildebolt |
| 4,091,721 A | 5/1978 | Cosmi |
| 4,112,131 A | 9/1978 | Bosy et al. |
| 4,118,164 A | 10/1978 | Wenger et al. |
| 4,541,329 A | 9/1985 | Mongiello |
| 4,592,274 A | 6/1986 | Tomatis |
| 4,622,228 A | 11/1986 | Ikeuchi et al. |
| 4,723,901 A * | 2/1988 | Sarumaru ............ B29C 47/0822 366/307 |
| 4,848,219 A | 7/1989 | Aldrovandi |
| 5,120,559 A | 6/1992 | Rizvi et al. |
| 5,165,948 A | 11/1992 | Thomas |
| 5,350,595 A | 9/1994 | Hockenberry et al. |
| 5,358,730 A | 10/1994 | Dame-Cahagne et al. |
| 5,514,853 A | 5/1996 | Le Viet |
| 5,547,277 A | 8/1996 | Caspelherr et al. |
| 5,595,775 A | 1/1997 | Tishel |
| 5,697,291 A | 12/1997 | Burgener et al. |
| 5,750,177 A | 5/1998 | Yee et al. |
| 5,792,500 A | 8/1998 | Housset et al. |
| 5,802,961 A | 9/1998 | Hay et al. |
| 5,906,853 A | 5/1999 | Smith |
| 5,942,263 A | 8/1999 | Chen et al. |
| 5,945,022 A | 8/1999 | Volpe et al. |
| 5,952,030 A | 9/1999 | Nelles et al. |
| 5,967,026 A | 10/1999 | Nelles et al. |
| 5,996,475 A | 12/1999 | Smith |
| 6,086,926 A | 7/2000 | Bruce et al. |
| 6,120,809 A | 9/2000 | Rhodes |
| 6,180,153 B1 | 1/2001 | Palus et al. |
| RE37,264 E | 7/2001 | Chen et al. |
| 6,319,526 B1 | 11/2001 | Dahlstrom et al. |
| 6,524,632 B2 | 2/2003 | Kartchner |
| 6,780,445 B1 | 8/2004 | Rhodes |
| 6,989,170 B2 | 1/2006 | Konanayakam et al. |
| 7,291,356 B2 | 11/2007 | Merrill et al. |
| 7,521,076 B1 | 4/2009 | Wenger et al. |
| 7,550,279 B2 | 6/2009 | Nickel |
| 7,579,033 B2 | 8/2009 | Merril et al. |
| 7,582,323 B2 | 9/2009 | Aird et al. |
| 7,585,537 B2 | 9/2009 | Merril et al. |
| 7,651,715 B2 | 1/2010 | Merril et al. |
| 7,666,458 B2 | 2/2010 | Merril et al. |
| 7,713,564 B2 | 5/2010 | Merril et al. |
| 7,955,814 B2 | 6/2011 | Kekreij et al. |
| 7,976,886 B2 | 7/2011 | Merril et al. |
| 7,987,774 B2 | 8/2011 | Wenger et al. |
| 8,021,704 B2 | 9/2011 | Merril et al. |
| 8,221,816 B1 | 7/2012 | Leffelman |
| 8,241,691 B2 | 8/2012 | Merril et al. |
| 8,603,554 B2 | 12/2013 | Merril et al. |
| 8,613,970 B2 | 12/2013 | Merril et al. |
| 8,628,810 B2 | 1/2014 | Barbano et al. |
| 8,932,657 B2 | 1/2015 | Nelles et al. |
| 2005/0249853 A1 | 11/2005 | Merrill et al. |
| 2008/0089987 A1 | 4/2008 | Horn |
| 2008/0131557 A1 | 6/2008 | Isse et al. |
| 2010/0051233 A1 | 3/2010 | Whitney et al. |
| 2010/0209584 A1 | 8/2010 | Weibel |
| 2010/0239713 A1 | 9/2010 | Merrill et al. |
| 2011/0091627 A1 | 4/2011 | Wenger et al. |
| 2012/0097048 A1 | 4/2012 | Tomatis |
| 2014/0027095 A1 | 1/2014 | Warchol et al. |
| 2014/0037812 A1 | 2/2014 | Oxboell et al. |
| 2015/0147443 A1 | 5/2015 | Nelles et al. |
| 2015/0296739 A1 | 10/2015 | Nelles et al. |

FOREIGN PATENT DOCUMENTS

| | | |
|---|---|---|
| JP | 07143844 | 6/1995 |
| WO | WO 94/09615 | 5/1994 |
| WO | WO 99/53749 | 10/1999 |

* cited by examiner

SECTION A-A

SINGLE AUGER EXTRUDER

CROSS-REFERENCE TO RELATED APPLICATIONS

This application is a non-provisional patent application of and claims priority under 35 U.S.C. § 119 to provisional patent application No. 62/118,981 filed Feb. 20, 2015, which is incorporated herein by reference in its entirety.

FIELD

The disclosure relates to methods and apparatuses for the production of cheese. In one embodiment, the disclosure relates to methods and apparatuses for making pasta filata cheese. In one embodiment, the disclosure relates to a housing made of cured, angular material for an auger. In one embodiment, the disclosure relates to a ribbed barrel for an auger.

BACKGROUND

Recently there has been an increase in the demand for cheeses that have widely differing performance characteristics. This particular demand is driven in part by the increasing variety of prepared foods in which such cheeses are included. In fact, there often is a need for different performance qualities even for foods of the same general type because of the different ways cheeses are utilized or because the cheese is exposed to differing cooking environments or conditions. Pizzas illustrate this point well because there are so many different types of pizzas. Pizzas, for example, have widely differing crusts, including thick, thin, or somewhere in between. The cheese can also be exposed or wrapped in the edge of the crust. Furthermore, the crust may be completely uncooked or it may be part-baked before being put in the oven with the cheese. Each of these variables potentially impacts the composition of the cheese required to provide satisfactory performance.

There are a variety of challenges to providing cheeses that have a composition which satisfies the desired performance characteristics and nutritional qualities. For instance, it can be difficult to obtain the desired concentration level of some ingredients in a cheese. Another problem is developing a process that activates the latent functional properties of certain ingredients. Another problem is that many methods for preparing cheese involve the loss of significant quantities of some cheese components during processing. This can occur, for instance, when such cheeses undergo the heating and stretching process of the pasta filata process. Often the heating is conducted in heated water, which can remove significant amounts of cheese ingredients.

In general terms, it is possible to state that all pasta filata cheeses are obtained by a working scheme essentially comprising the following steps: milk treatment, acidification (by adding ferments or organic acids such as citric acid), addition of rennet, curdling, cutting of the curd, extraction of whey, kneading and stretching in hot water ("filatura"), shaping, cooling and stiffening, packaging with or without a conservation (preserving) liquid of the final product. Therefore, differences that can be found in the different preparations are due to the kind of milk used and to the variation of technology adopted, and the products thus obtained are quite similar to one another.

In view of the high demand for cheese and the foregoing shortcomings associated with some existing methods and apparatuses, there remains a need for additional methods and apparatuses for preparing cheeses of these types.

BRIEF SUMMARY

The disclosure relates to methods and apparatuses of making a pasta filata cheese. In one embodiment, the disclosure relates to a housing formed by sections of angular material. In one embodiment, the angular material forms ribs within the interior of the housing. In another embodiment, the housing formed with angular material eliminates crevices or joints between the connection points of the angular material. In one embodiment, the disclosure relates to housing with ribs that can accommodate and withstand high pressures. In another embodiment, the fluidity of the ribs eliminates crevices that often cause contamination. In one embodiment, the housing is a barrel.

In another embodiment, the disclosure relates to a barrel for an auger, wherein the barrel comprises multiple ribs. In one embodiment, the disclosure relates to a barrel formed from curved, angular sections of stainless steel. In still another embodiment, the disclosure relates to a barrel formed of angular sections of stainless steel as shown in FIG. 3. In still another embodiment, the disclosure relates to a barrel formed of angular sections of stainless steel as shown in FIG. 4.

In one embodiment, the disclosure relates to a barrel for an auger comprising: an interior portion having angular sections of material welded together, wherein each angular section has a first sidewall portion and a second sidewall portion each connected to and extending outwardly from a bottom curved wall portion, each first and second sidewall portions extending outwardly away from the respective other of the first and second sidewall portions.

In another embodiment, the first wall portion coincides with a first wall axis and the second wall portion coincides with a second wall axis, and the first and second wall axes extend to intersect at a vertex, form a central angle from about 15° to about 25°.

In yet another embodiment, the barrel can be surrounded by a jacket. In still another embodiment, the jacket is spaced at a distance away from the barrel to create a gap. In one embodiment, heated water flows through the gap.

In another embodiment, the disclosure relates to a housing comprising multiple sections of angular material coupled together, wherein no voids or dead-space are generated when coupling the angular material to form the housing. In one embodiment, the angular material forms ribs within the interior of the housing. In one embodiment, the housing is a barrel for an auger.

In another embodiment, the disclosure relates to a system, including but not limited to a cheese processing apparatus, comprising: a barrel having an inlet and an outlet and formed of material having a first sidewall portion of angular shape, a second sidewall portion of angular shape, each first and second sidewall extending from a curved bottom portion; and an auger located between the inlet and outlet of the housing.

An advantage of the methods and systems disclosed herein is that a barrel made of angular material is rounded at the edges, which prevents cutting and protects the fat and moisture held in the cheese matrix.

An advantage of the methods and systems disclosed herein is that the barrel made of angular material produces a design that can withstand high pressures. The ribbed structure helps to withstand high pressures.

An advantage of the methods and systems disclosed herein is that the barrel with angular material disconnects easily for cleaning and maintenance.

An advantage of the methods and systems disclosed herein is that the barrel with ribs can be used with an auger and can be used with multiple machines.

An advantage of the methods and systems disclosed herein is that the barrel design eliminates concerns of contamination.

An advantage of the methods and systems disclosed herein is that the barrel design eliminates crevices that can be a source of contamination.

DETAILED DESCRIPTION

Definitions

Figure 1:
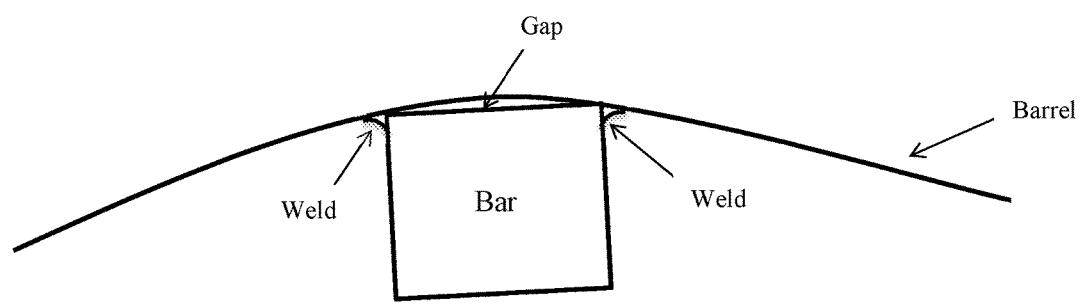
FIG. 1 is a schematic of a traditional barrel with squares connected to the barrel and creating gaps.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

As used herein, "about" refers to up to plus or minus 10% of the indicated number. For example, "about 25° C." refers to 22.5° C. to 27.5° C. In some embodiments, about refers to up to plus or minus 9, 8, 7, 6, 5, 4, 3, 2, or 1% of the indicated number. When only integer values are possible, "about" refers to up to plus or minus 10% rounded to the nearest integer number. All numbers and numerical ranges recited herein are intended to include the term "about." Thus, even if the number or numerical range is not preceded by the term "about," number or numerical range are intended to cover plus or minus 10% of the indicated number. For example, a recited temperature range of "10 to 20" is intended to include "9 to 22."

As used herein, "auger stretching" refers to a continuous stretching and mixing of cheese and ingredients with low, medium, or high moisture content. The auger pitch, overlap and clearances are key to the performance and capacity of the unit.

As used herein, "central angle" is an angle whose apex (vertex) is the center of a circle and whose legs (sides) are radii intersecting the circle in two distinct points. The central angle is subtended by an arc between those two points, and the arc length is the central angle (measured in radians) times the radius.

As used herein, Clean-In-Place Section Belt Cleaning refers to the belt that will be continuously water rinsed during the production process to restrict the reheating of cheese particles that cling to the belt. In one embodiment, the cabinet or component containing the continuous cooker stretcher source can be manually cleaned.

As used herein, the Clean-in-Place Cabinet Cleaning refers to a cabinet that will be efficiently and automatically cleaned via a CIP wash and rinse cycle provided by a CIP system.

As used herein, a "cyclone" is an apparatus for separation of cheese curd in an airstream by the use of centrifugal forces. Cheese curd drops out of the bottom and air is evacuated out the top.

As used herein, a "curd mill" may reduce the size of the curd to a uniform size necessary for providing even heating. In one embodiment, a curd mill may be used while in other embodiments, a curd mill may not be required.

As used herein, the term "fluid" includes both the liquid and gas phases.

As used herein, "fluid dispensing" refers to positive displacement pump heads coupled with a stepping motor drive or other positive displacement or metering device allowing the system to have highly precise flow rates of liquids and slurry delivery.

As used herein, "heating" refers to the process of increasing the temperature of a product, including but not limited to a dairy product and cheese curd. In one embodiment, heating results in cooking the product to the final state. In another embodiment, heating results in transforming the product from a first uncooked state to a second uncooked state.

As used herein, an "ingredient dispenser" feeds dry ingredients at a precise and adjustable flow rate. The dispenser utilizes a positive driven internal auger to gently fluidize ingredients without breaking down the base composition.

As used herein, the term "input material" includes but is not limited to cheese precursor, curd precursor, cream, and cheese curd.

As used herein, the term "housing" refers an enclosed space or compartment. In one embodiment, the housing can be within a larger apparatus. The terms housing and chamber can be used interchangeably unless explicitly stated otherwise.

As used herein, the term "manipulating" refers to transforming a product from a first state to a second state. In one embodiment, manipulating includes but is not limited to shaping, molding, sizing, cutting, milling, grinding, leveling and augering a product. In yet another embodiment, manipulating includes transforming a product from a first state to a second state, wherein the second state has a more uniform shape, size, volume, density, mass or weight as compared to the first state.

As used herein, "ribbed design" refers to a structure having raised bands or ridges.

A "soft or firm/semi-hard cheese" as used herein generally includes cheeses that have a percentage moisture on a fat free basis (MFFB) of about 54% or more, by weight. The term includes firm/semi-hard cheeses that have a MFFB, for example, of about 54% to about 80%, by wt., and cheeses with a MFFB, for example, of about 58% to about 75%, by wt. The term may also include soft cheeses with a MFFB of greater than about 60%, by wt. The term encompasses a variety of well-known cheeses including, but not limited to, Colby, Havarti, Monterey Jack, provolone, Gorgonzola, Gouda, Cheshire and Muenster, which are examples of "firm/semi-hard cheeses." Also included in the term are popular "soft cheeses" such as Mozzarella, cream cheese, and cottage cheese. A variety of mozzarella cheeses are included by the term; these can be in the soft or firm/semi-hard category, or in between the two, depending upon their moisture content. Standard mozzarella, for example, is a soft cheese, part-skim mozzarella is between soft and firm/semi-hard, and low-moisture mozzarella and low-moisture part-skim mozzarella are both designated as firm/semi-hard cheeses. The term soft or firm/semi-hard as used herein includes cheeses meeting the CODEX definition of a soft or firm/semi-hard cheese. The term also includes soft or firm/semi-hard cheeses as defined by other local, regional, national or international agencies or organizations.

Cheeses within the "soft or firm/semi-hard" category as defined herein can be prepared using a variety of methods, including conventional methods, as well as by "alternative make" provisions. The term includes, for instance, cheeses made by a process in which a cheese curd is heated and kneaded to improve the stretchability or stringiness of the final cheese, provided the cheese falls within the MFFB parameters set above. This process and related processes are sometimes referred to as a pasta filata process of manufacturing. Cheeses made by this process are known under a variety of names, including mozzarella, pasta filata, provolone, Mexican style, scamorze, and pizza cheese. Cheeses made by alternative make procedures are prepared by alternative methods of making cheeses, so long as the procedure produces a cheese having the same physical and chemical properties of the type of cheese made by a specified process (e.g., a process specified by a regulatory agency) and falls within the MFFB parameters set forth above.

The "soft" and "firm/semi-hard" cheeses that are provided include standard and non-standard cheeses and cheese products having the foregoing moisture characteristics. Standard cheeses are those that satisfy the standards as set forth by a regulatory body with respect to a particular type of cheese. A non-standard cheese is one whose composition does not meet the standard. A soft or firm/semi-hard cheese can also be a processed cheese. A soft or firm/semi-hard cheese can also be ripened or unripened.

"Mozzarella" cheese has a minimum milkfat content of 45% by weight of the solids and a moisture content of more than 52% but not more than 60% by weight. "Low-moisture mozzarella" cheeses have a minimum milkfat content of 45% by weight of the solids and the moisture content is more than 45% but not more than 52% by weight. "Part-skim mozzarella" has a moisture content of more than 52% but not more than 60% by weight, and a milk fat content that is less than 45% but not less than 30% calculated on the solids basis. "Low-moisture part-skim" mozzarella has a moisture content of more than 45% but not more than 52% by weight and a milkfat content, calculated on the solids basis, of less than 45% but not less than 30%. Further details regarding these various mozzarella cheeses is provided by 21 C.F.R. §§ 1.33.155-133.158.

The term "cheese precursor" as used herein refers broadly to any ingredient that is used to prepare a cheese curd, mixtures of such ingredients and subsequent processed forms of the cheese curd other than the final cheese product. Examples of cheese precursors that are ingredients include, but are not limited to, unpasteurized milk (sometimes referred to in the industry as "raw milk"), the growth medium and bacteria used in the cheese making process (sometimes referred to in the industry as "starter"), and cream. Mixtures of such ingredients are also included. One specific example of such mixtures is "vat liquid," which is a term used to refer to a combination of pasteurized milk, starter and cream. The term also includes coagulum, cheese curd, and processed cheese curd, and whey.

The term "cream" means the liquid milk product high in fat separated from milk which may have been adjusted by adding thereto: milk, concentrated milk, dry whole milk, skim milk, concentrated skim milk, nonfat dry milk or other GRAS ingredients. "Whey cream" is the liquid milk product high in fat separated from whey (cheese, casein, or other), which may have been adjusted by adding thereto: whey, concentrated whey, dry whey, or other GRAS ingredients. "Pro-cream" is the liquid milk product high in fat collected as retentate from a whey filtration process such as microfiltration which may have been adjusted by adding thereto: whey, concentrated whey, dry whey, or other GRAS ingredients.

The term "curd precursor" refers to any soft or firm/semi-hard cheese ingredient, mixture or composition that exists or is formed prior to formation of the cheese curd. The term thus includes, for example, raw milk, milk powder, milk concentrate, skim milk concentrate, starter, cream, cheese vat liquids and coagulum.

The methods and apparatuses disclosed herein are directed toward pasta filata cheese. The principal varieties of pasta filata cheeses are: Caciocavallo, Provolone, Provolette, Pizza Cheese, Mozzarella, Provole, Scamorze, and Provatura. The well-known example of pasta filata-type of cheese is mozzarella. In the U.S., the standards of identity of the code of federal regulations subdivides mozzarella cheeses into: "Mozzarella", "Low Moisture Mozzarella", "Part Skim Mozzarella" and "Low Moisture Part Skim Mozzarella."

FIG. 1 is a representative schematic of a traditional barrel for a single auger extruder. Conventional single auger extruders are manufactured by making a round barrel and welding a solid, rectangular or square bar along the length of the barrel. Traditionally, several of these bars are welded on to the tube in parallel. As depicted in FIG. 1, a square bar is welded onto the inside of a barrel. When a square bar is welded to a curved surface, a gap is formed between the round barrel and the straight back of the bar after it has been welded. If one of these welds crack due to fatigue or thermal stresses, the cheese liquid, cream, or water can enter this area and become trapped. This creates an unsanitary condition as the area cannot be cleaned, and a crack is not easily detected.

In addition, these bars, as used on other designs, have sharp edges and flat surfaces that the cheese encounters as the auger rotates. These sharp edges can cut the cheese, which causes fat loss and loss of yield.

I. Barrel for an Auger

In one embodiment, the disclosure relates to a barrel for an auger. In one embodiment, the barrel has an interior formed by joining angular, curved material. In another embodiment, the joined angular, curved material forms ribs in the interior of the barrel. In one embodiment, the barrel can be used to house a single auger extruder.

In one embodiment, the barrel is a circular array of curved, angular material, including but not limited to stainless steel. In one embodiment, the barrel has ribs protruding to the interior of the barrel.

In one embodiment, the disclosure relates to a barrel comprising angular material having a first sidewall portion, and a second sidewall portion connected to and extending from a curved base portion. In another embodiment, the first sidewall portion and the second sidewall portion extend away from the respective other.

In one embodiment, the disclosure relates to a barrel for an auger comprising: an interior portion formed by welding sections of material together, wherein each section has a first sidewall portion and a second sidewall portion each connected to and extending outwardly from a bottom curved wall portion, each first and second sidewall portions extending outwardly away from the respective other of the first and second sidewall portions.

Figure 2:
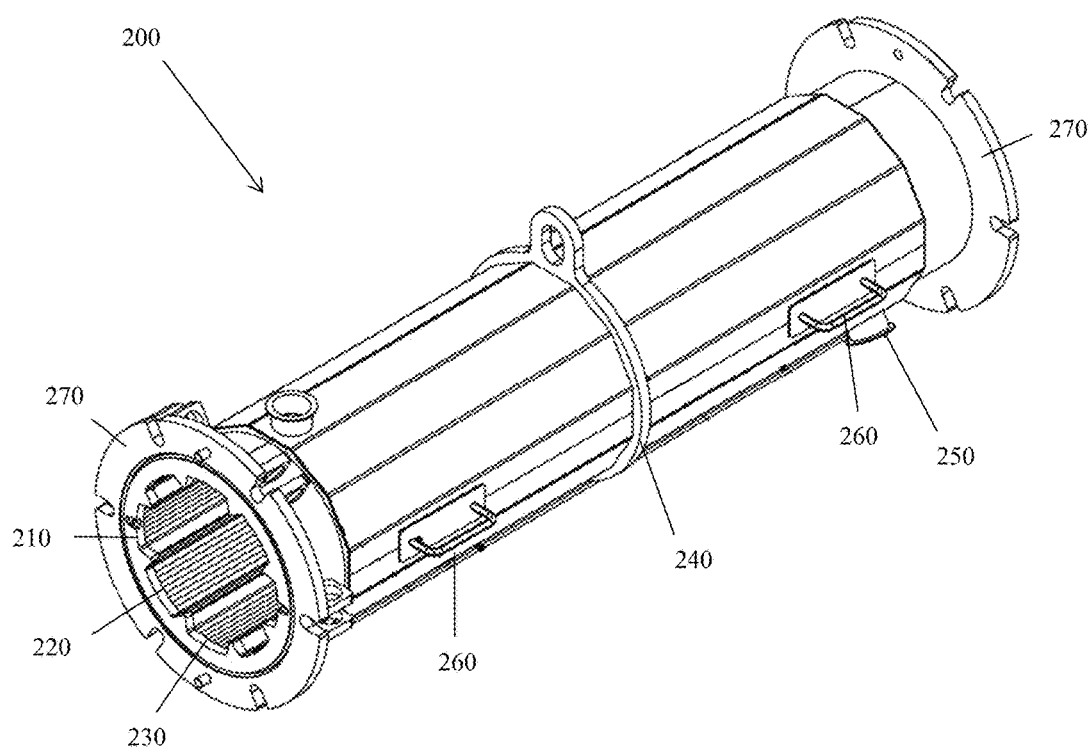
FIG. 2 is a representative depiction of a jacketed barrel as disclosed herein with ribs visible in the interior of the barrel.

FIG. 2 is a representative schematic of a jacketed barrel 200 for an auger as disclosed herein. As shown in FIG. 2, multiple sections, as exemplified by 210, 220, and 230, of curved angular material are joined together to form an interior of the barrel. The barrel has ribs in the interior portion of the barrel. The joined curved, angular material with the formation of the ribs eliminates crevices and reduces contamination.

A barrel mid-rib 240 is shown as well as a ferrule clamp 250. The barrel can have one or more handles 260. Containment housing is shown as 270.

Figure 3A:
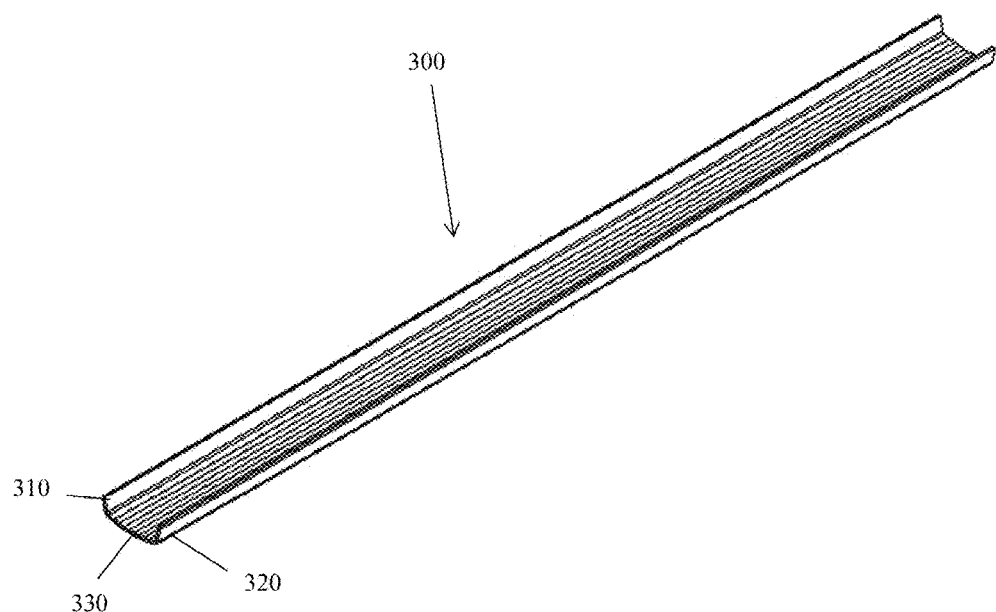
FIGS. 3A and 3B are representative depictions of angular material as disclosed herein.
Figure 3B:
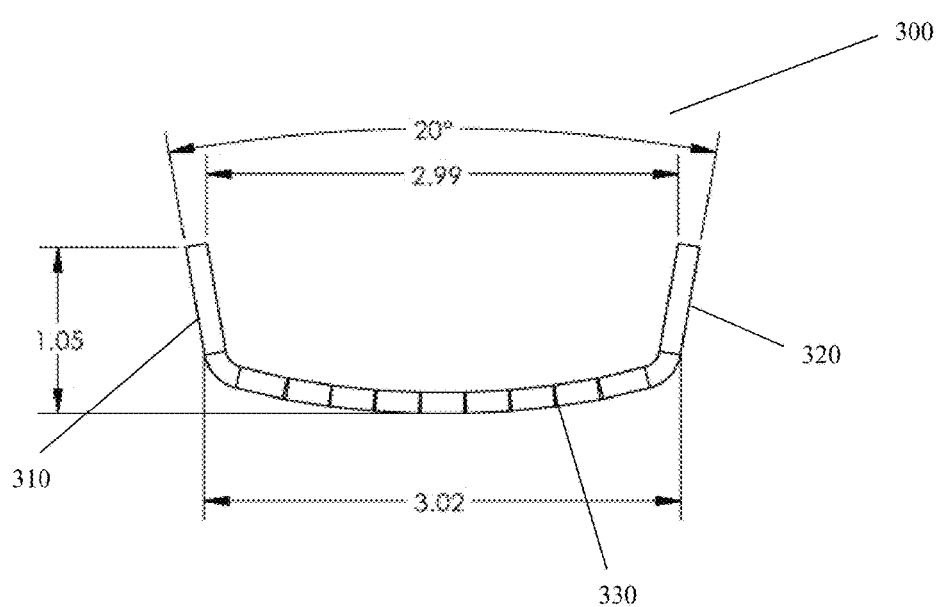

FIGS. 3A and 3B are representative schematics of angular material 300 of an embodiment disclosed herein. As show in FIG. 3A, the angular material has a first sidewall portion 310 and a second sidewall portion 320. The first sidewall portion 310 and the second sidewall portion 320 extend away from a cured bottom base 330. Joining pieces of angular material 300 can form ribs within the interior of the barrel.

In one embodiment, the angular material can be made of any suitable material including but not limited to stainless steel, stainless steel 304, stainless steel 316, aluminum, copper, and tin.

In another embodiment, multiple section of angular material can be joined together including but not limited to 4, 5, 6, 7, 8, 9, 10, 11, 12, 13, 14, 15, 16, 17, 18, 18, 20, 21, 22, 23, 24, 25, 26, 27, 28, 29, 30, and greater than 30. The number of sections of angular material joined together depend on the size of the barrel.

In yet another embodiment, the barrel has at least 6 sections of angular material joined together. In still another embodiment, the barrel has at least 8 sections of angular material joined together. In another embodiment, the barrel has at least 10 sections of angular material joined together.

In still another embodiment, the angular sections of material can be welded together. In one embodiment, the welds are smooth and contiguous. In another embodiment, the welds are free of pits, peaks, crevices and snags.

As shown in FIG. 3B, a first sidewall portion 310 and a second sidewall portion 320 attach to and extend away from a curved bottom portion 330. The length on the angular material can vary depending on the size of the barrel. Representative measurements are shown but should not be construed to limit the disclosure herein.

The first wall portion 310 coincides with a first wall axis and the second wall portion 320 coincides with a second wall axis, and the first and second wall axes extend to intersect at a vertex, and form a central angle. In one embodiment, the first and second wall axes extend to intersect at a vertex, and form a central angle of 20°.

In one embodiment, the first and second wall axes extend to intersect at a vertex and form a central angle selected from the group consisting of 14°, 15°, 16°, 17°, 18°, 19°, 20°, 21°, 22°, 23°, 24°, 25°, 26°, 27°, 28°, 29°, and 30°.

In one embodiment, the first and second wall axes extend to intersect at a vertex and form a central angle of at least 15°. In one embodiment, the first and second wall axes extend to intersect at a vertex and form a central angle of at least 18°. In one embodiment, the first and second wall axes extend to intersect at a vertex and form a central angle of at least 20°.

In one embodiment, the first and second wall axes extend to intersect at a vertex and form a central angle ranging from about 10° to about 30°. In one embodiment, the first and second wall axes extend to intersect at a vertex and form a central angle ranging from about 15° to about 25°. In one embodiment, the first and second wall axes extend to intersect at a vertex and form a central angle ranging from about 15° to about 22°. In one embodiment, the first and second wall axes extend to intersect at a vertex and form a central angle ranging from about 15° to about 20°.

In one embodiment, the first and second wall axes extend to intersect at a vertex and form a central angle ranging from about 18° to about 25°. In one embodiment, the first and second wall axes extend to intersect at a vertex and form a central angle ranging from about 18° to about 22°. In one embodiment, the first and second wall axes extend to intersect at a vertex and form a central angle ranging from about 18° to about 20°.

Figure 4A:
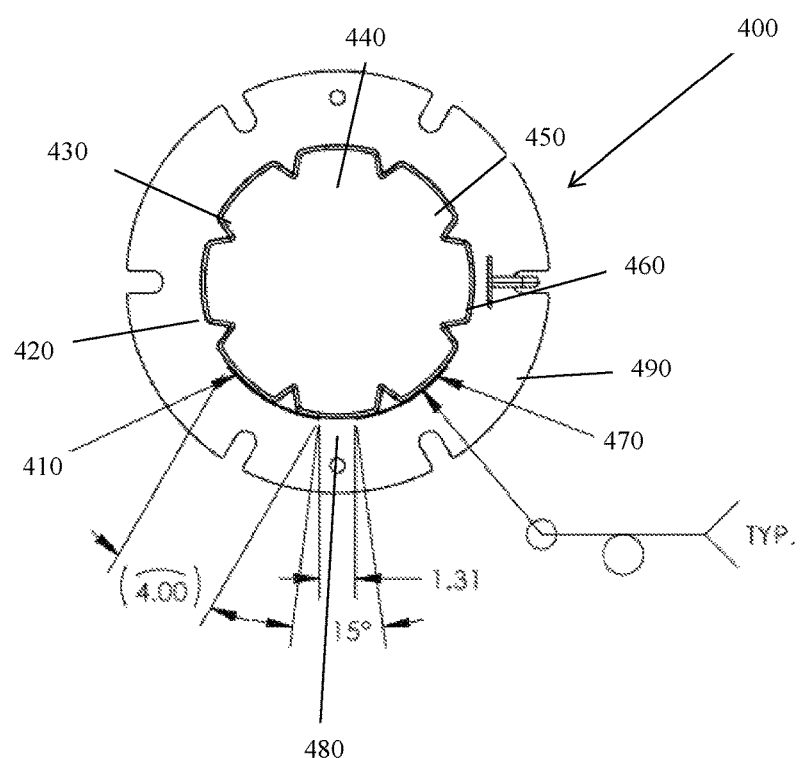
FIG. 4A is a cross sectional section view of the barrel showing the coupled angular sections and the formed ribs.

FIGS. 4A-4E are representative depictions of the interior of the barrel 400 with sections of angular material visible. As shown in FIG. 4A, the barrel has an interior portion. Eight sections of angular material 410, 420, 430, 440, 450, 460, 470, 480, are joined together. FIG. 4A shows the barrel with the ribs and the outlet end flange 490. On the right at about the 3 o'clock position is a cross cut of the handle used to manually move the barrel for cleaning and disassembly. The flange shown is at the end of the barrel and is welded to the barrel. The outlet port is clamped to this flange.

Figure 4B:
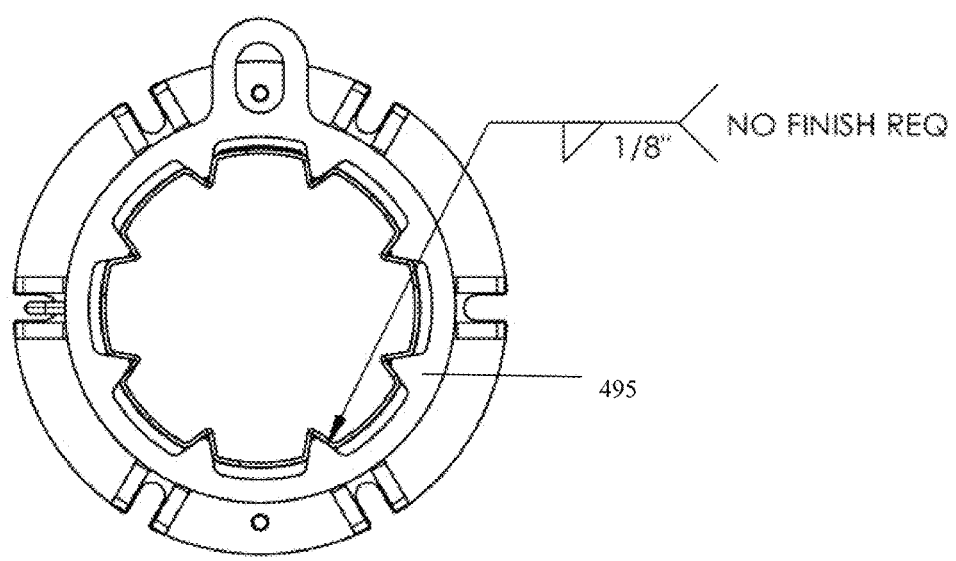
FIG. 4B is a cross sectional view of the barrel showing the end flange where it clamps to the housing, and also the middle flange.

FIG. 4B is a cross cut view of the barrel showing the end flange where it clamps to the housing, and also the middle flange. FIG. 4B displays the middle flange 495 welded to the ribs of the barrel; the flange is only welded at the ribs. The openings can be seen between the barrel and the flange. This opening is left by the ribs and serves to allow hot water to flow in the water jacket from one side of the flange to the other. An oval shaped opening at the top of the center flange 495 serves as an attach point for a hoist used to move the barrel for cleaning.

Figure 4C:
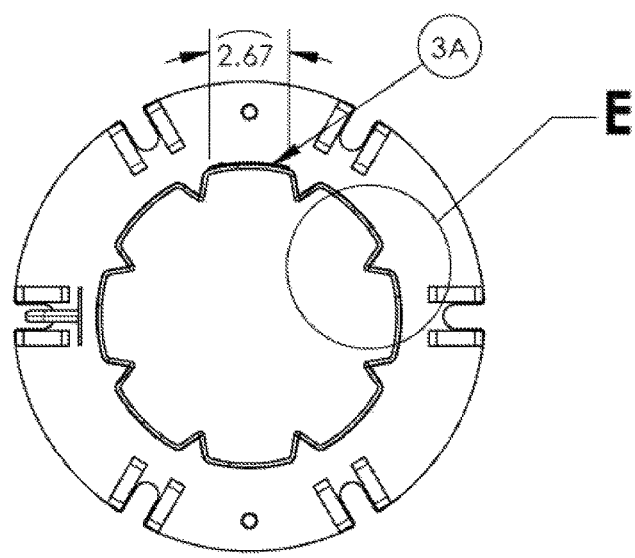
FIG. 4C is a cross sectional view that shows the barrel weldment to the end flange.

FIG. 4C shows the barrel weldment to the end flange that attaches to the housing. The lugs to which the swing bolts will be attached and are used to join the housing to the barrel are also shown.

Figure 4D:
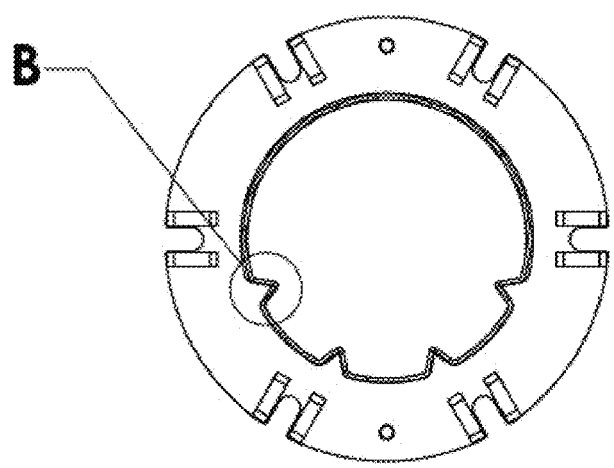
FIG. 4D is a representative depiction that shows the flange that connects from the housing to the barrel.

FIG. 4D is a representative depiction of the flange that connects from the housing to the barrel. The housing has a hopper that attaches to the top of it. Locating pins are shown by the small circles at 12 o'clock and 6 o'clock that align the barrel with the housing. The ribs in the bottom of the flange are what "hold the cheese" and cause it to travel toward the barrel rather than wrapping around the auger and turning with the auger.

Figure 4E:
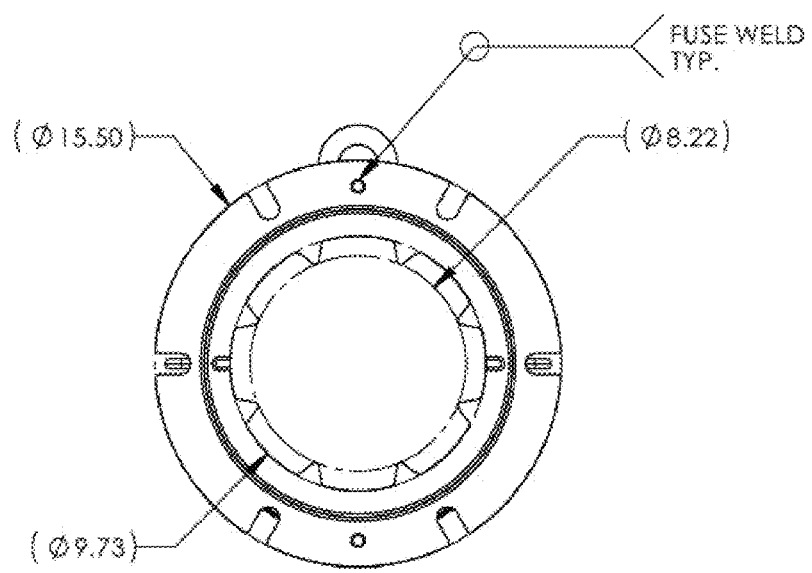
FIG. 4E is an end view of the discharge end flange on the barrel.

FIG. 4E is an end view of the discharge end flange on the barrel. Locating pins are found on the top and bottom. The small ovals on the 9 and 3 o'clock edges of the flange are notches that will hold an auger support bracket. There is also an "o"-ring groove in the face of the flange to seal this flange to the outlet flange.

Figure 5A:
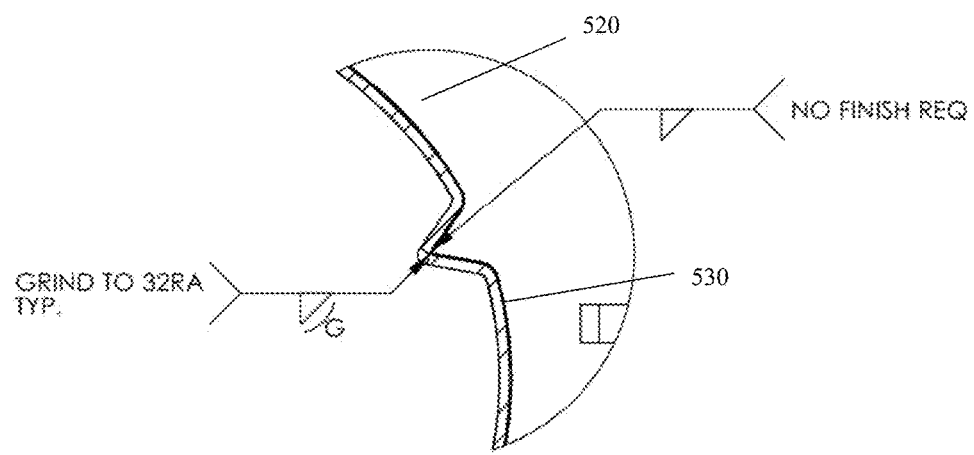
FIGS. 5A and 5B are exploded views of the junctions between two of the joined angular sections.
Figure 5B:
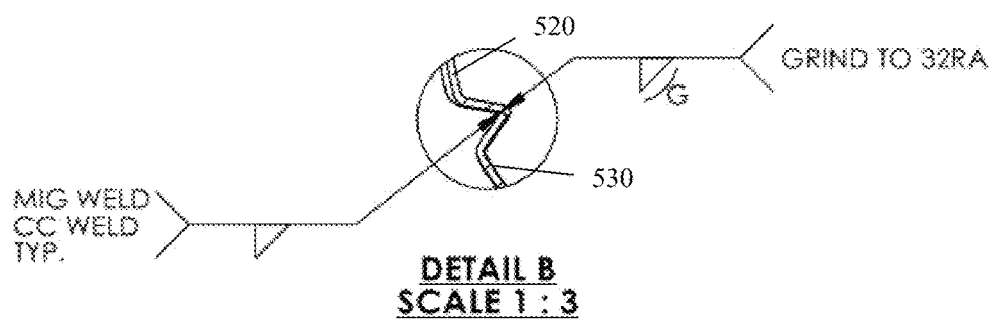

FIGS. 5A and 5B an exploded view of the junction between two of the angular sections 520, and 530. The curved, angular features eliminate any crevices between the angular sections 520 and 530. The curved, angular features provide for a tight junctions between the angular sections. The cured, angular features reduce risk of contamination due to the tight junction between the angular sections. In addition, the smooth, soft angles of the junctions reduce the amount of tearing of the dairy product, for example cheese curd.

As shown in FIG. 5B, the junction between the two angular sections is smooth and contiguous. No gaps exist between the two angular sections, which reduces the risk of contamination.

In one embodiment, a barrel having curved, angular sections joined together as disclosed herein reduces the level of contamination by at least 3%, or at least 5%, or at least 8%, or at least 10%, or at least 15%, or at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, or at least 90%, or at least 95% as compared to barrel without the curved, angular sections.

In one embodiment, a barrel having curved, angular sections joined together as disclosed herein reduces the level of contamination from 1 to 3%, or from 1 to 5%, or from 1 to 10%, or from 1 to 15%, or from 1 to 20% as compared to barrel without the curved, angular sections.

In one embodiment, a barrel having curved, angular sections joined together as disclosed herein reduces the level of contamination from 5 to 10%, or from 5 to 15%, or from 5 to 20%, or from 5 to 25%, or from 5 to 30%, or from 5 to 35%, or from 5 to 40%, or from 5 to 50%.

Figure 6:
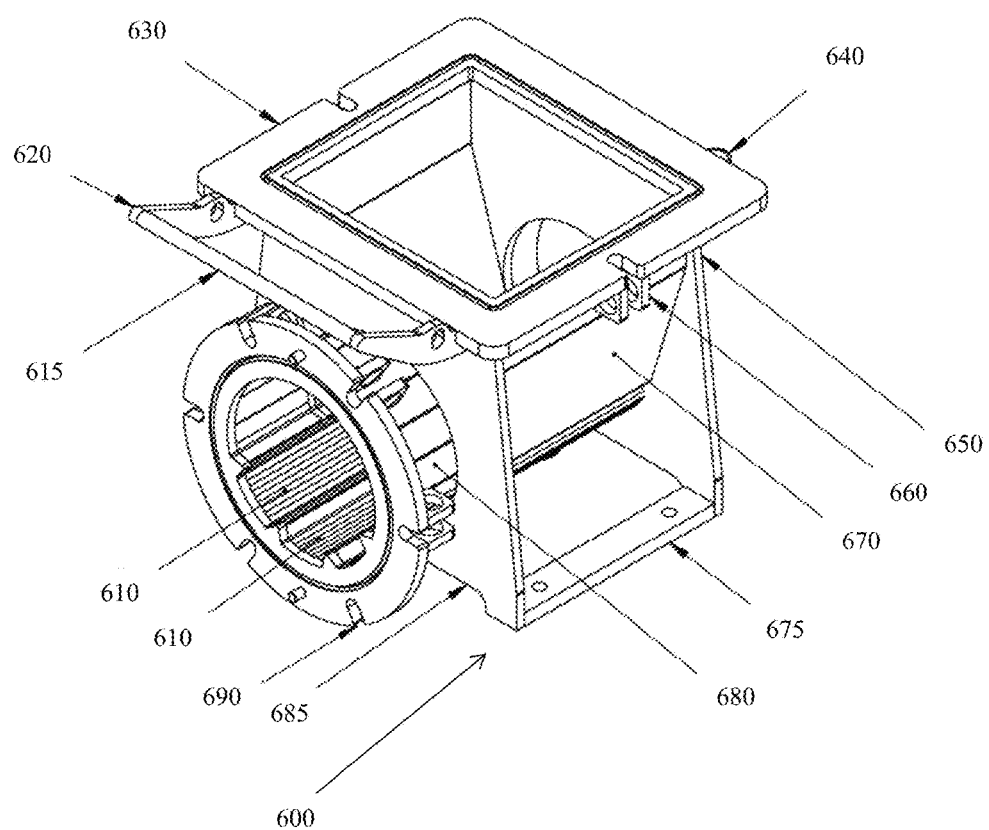
FIG. 6 is a representative depiction of a barrel formed of angular sections coupled to a housing.

FIG. 6 is a representative schematic of the barrel having angular curved material and attached to a housing 600. Ribs 610 are formed in the interior of the barrel. In one embodiment, the ribs are formed by joining or coupling angular sections of material. In yet another embodiment, the ribs are formed by joining or coupling angular sections of stainless steel. In still another embodiment, the ribs are formed by welding angular sections of stainless steel.

A round bar 615 is shown, which is part of the hopper stop 620. The hopper stop 620 allows the hopper to lean forward for cleaning and maintenance purposes.

A hopper flange is shown as 630. The housing can also have a proximity sensor holder 640. A containment housing end plate is shown as 650 and a hopper hold down mount is shown as 660. A containment housing side wall is shown as 670, and a mounting foot as 675. A containment housing barrel extension is shown as 680 and a containment housing end plate, front, as 685. Finally, the containment housing flange is shown as 690.

II. Cheese Processing System

Figure 7:
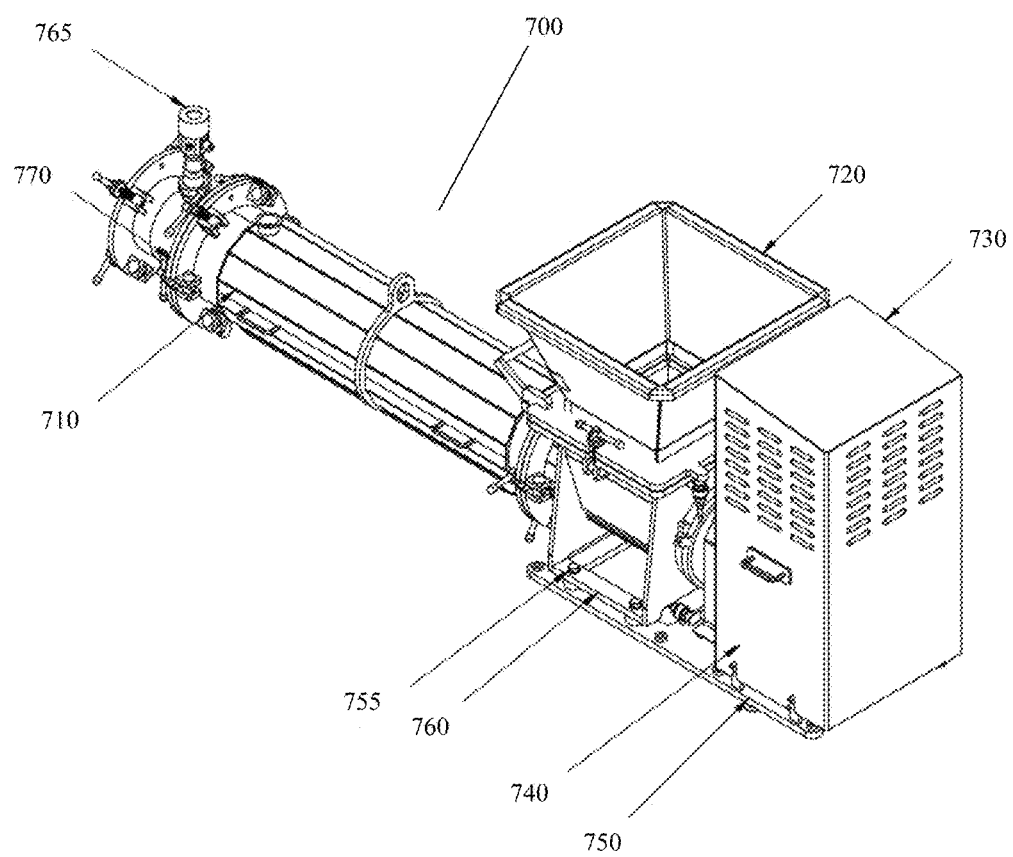
FIG. 7 is a representative depiction of a cheese processing system with a barrel, as disclosed herein, and housing a single auger extruder.

FIG. 7 is a representative schematic of a cheese processing system 700 with a barrel having angular, curved material for a single auger extruder. A jacketed barrel 710 contains the single auger extruder. The barrel is made of curved, angular material as disclosed herein. Using the curved, angular material allows the cheese being pushed by the auger to be directed back toward the center of the auger by the gentle angles of the curved material, which keeps the dairy material, for example cheese curd, from rotating with the auger. The angular material moves the cheese toward the center of the auger; the cheese moves along the barrel without cutting or turbulent flow.

The cheese processing system 700 also contains a hopper 720. The bottom support structure of the hopper 760 is coupled to the base plate using appropriate connectors, see for example 755 (gasket washer). A motor housing unit 740 is placed onto a base plate 750. A pressure transmitter is shown as 765.

Figure 8A:
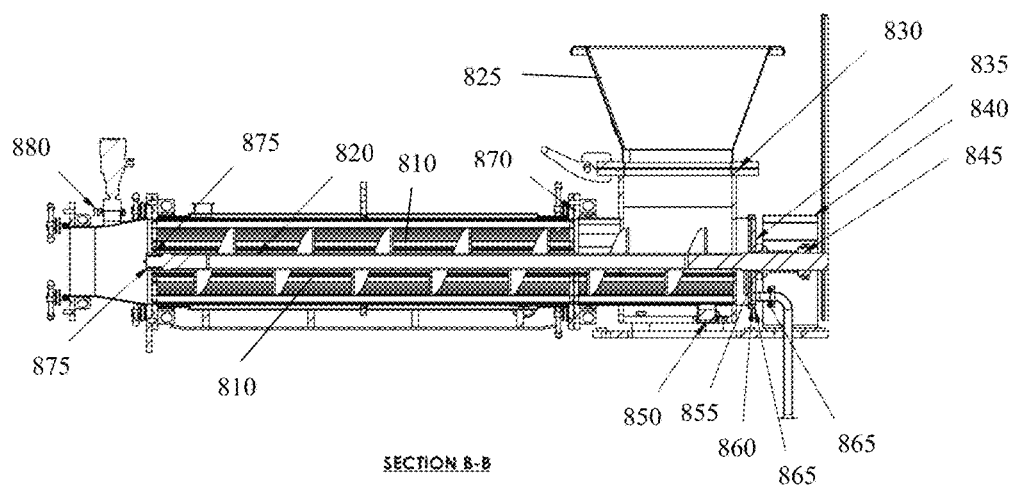
FIG. 8A is cross sectional view of a barrel formed of angular sections and disclosed herein.

FIG. 8A is a representative depiction of a cheese processing system 800 showing a cross sectional view of the jacketed barrel. Ribs 810 are formed by joining the angular sections of material. The ribs aid in moving the cheese toward the center of the auger, and reduce the amount of cutting of the cheese, which lowers fat loss.

A single auger 820 is shown as well as a hopper 825. Various components that are used to assemble the cheese processing system are shown throughout the depiction including: hopper gasket 830, cream drain cap 835, auger shaft 840, a shaft seal assembly 845, an end cap 850, containment housing 855, a gasket 860, a clamp 865, o-ring 870, idler brkt, 875, and a heavy duty claim 880.

Figure 8B:
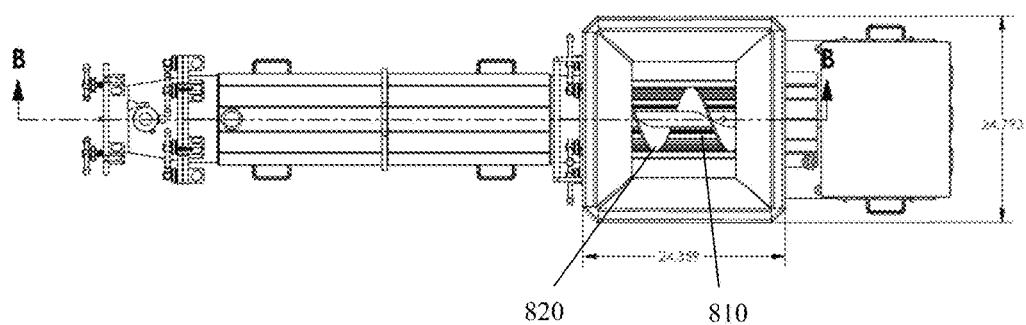
FIG. 8B is a top perspective view of a barrel formed of angular sections and disclosed herein.

FIG. 8B is a top view of the cheese processing system through the hopper showing the interior of the barrel with the auger 820 and ribs 810 visible.

Figure 9:
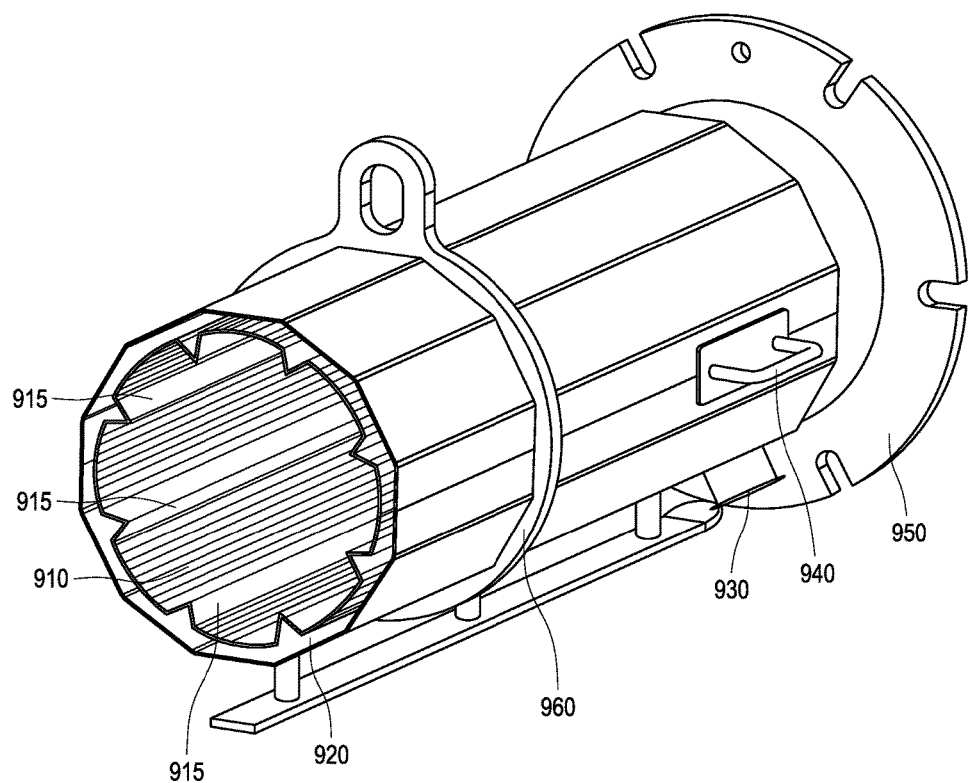
FIG. 9 is a representative depiction of a barrel having angular sections surrounded by a jacket with a gap between the barrel and the jacket.

FIG. 9 is a representative depiction of the jacketed barrel 900 that can be used in a cheese processing system. The barrel 910 has ribs 915 that aid in movement of the processed material. The angled design of the ribs provides for an ideal environment for the processed material, as the angled design reduces the amount of tearing of the processed material.

The angular sections are welded together and form the barrel around the auger. The wedge shapes protruding from the outside toward the center of the barrel hold the cheese so turning auger will push it straight down the barrel. Conversely, if the barrel were simply round, the cheese would slide on the barrel and wrap itself around the auger and turn with the auger. When this happens, cheese will stop moving along the length of the barrel and the flow of cheese will stop.

An outer jacket 920 surrounds the barrel and is also spaced out from the barrel. In one embodiment, the water jacket is not completely round but rather is "bumped" so that it is easier to fit around the barrel. The jacket can have multiple flat sides.

In one embodiment, the jacket 920 is approximately ⅜" away from the barrel at the closest location. In another embodiment, the jacket can be any suitable distance away from the barrel provided the gap is sufficient to allow water flow, including but not limited to ⅜", ⅝", ⅝", ⅞", 1", 1.5", 2.0", 2.5", 3.0", 3.5", 4.0", 4.5", 5.0", and greater than 5" at the closes location.

In another embodiment, the jacket 920 is approximately from ⅜" to ⅞" away from the barrel at the closest location.

In another embodiment, hot water flows through the gap between the barrel and the outer jacket to heat the barrel and keep the cheese warm. A water inlet is shown as 930.

In one embodiment, hot water flow would be approximately 20 gallons per minute through the water jacket on the barrel. In another embodiment, water flow can be any flow rate sufficient to heat the case appropriately including but not limited to 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, and greater than 40 gallons per minute.

In still another embodiment, water flow between the barrel and the jacket can be from 5 to 20 gallons per minute or from 5 to 25 gallons per minute or from 5 to 30 gallons per minute, or from 5 to 40 gallons per minute.

In still another embodiment, water flow between the barrel and the jacket can be from 18 to 22 gallons per minute or from 18 to 30 gallons per minute.

In still another embodiment, water flow between the barrel and the jacket can be from 20 to 24 gallons per minute, or from 20 to 30 gallons per minute.

In still another embodiment, water flow between the barrel and the jacket is at least 20 gallons per minute.

A handle can be coupled to the outer jacket 920 for aid of transport. The inlet flange is shown as 950 and the mid-rib shown as 960.

Figure 10:
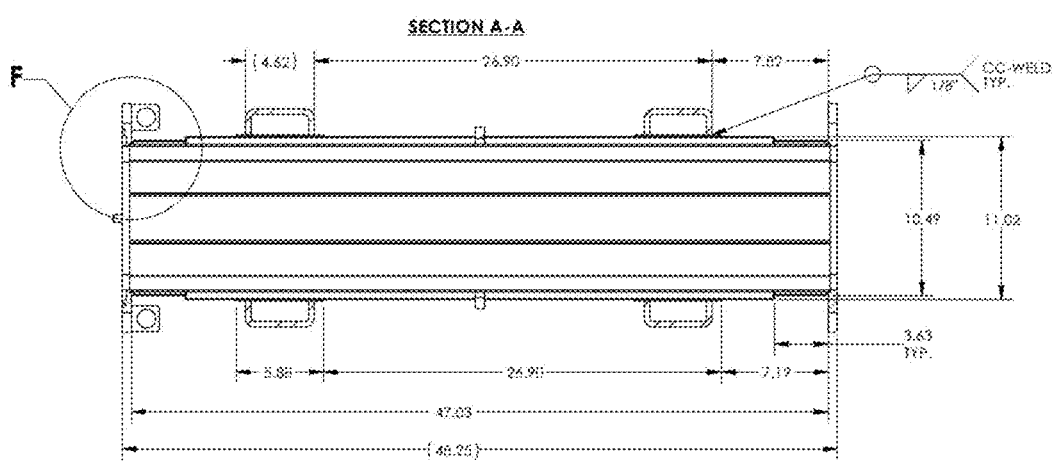
FIG. 10 is a representative depiction of a jacked barrel showing various measurements, which are for ease of understanding and should not be construed to limit the disclosure.

FIG. 10 is a representative depiction of a jacketed barrel with representative dimensions shown. One of skill in the art will understand the dimensions provided are representative only, and that modifications can be made to suit a particular need.

The methods and systems disclosed herein can be used with other systems and methods for making pasta filata cheese including those described in the following U.S. Pat. Nos. 6,458,397; 6,026,740; 5,988,052; 5,711,976; 5,792,497; 6,916,500; 5,881,639; 8,852,662; and 8,932,657, which are all incorporated herein by reference in their entireties.

III. Methods of Extruding Pasta Filata Cheese

In one embodiment, the disclosure relates to a method comprising extruding pasta filata cheese through a barrel having curved, angular sections wherein the barrel lacks any crevices. In one embodiment, the disclosure relates to a method for extruding pasta filata cheese comprising extruding pasta filata cheese through a barrel having multiple ribs in the interior portion and housing a single auger extruder, wherein the pasta filata cheese can be extruded at high pressures.

In one embodiment, the disclosure relates to a method comprising: extruding pasta filata cheese using a single auger extruder housed in a barrel formed with curved, angular sections, wherein the angular sections reduce the amount of fat loss as compared to extruding though a barrel without the curved, angular sections.

In one embodiment, extruding pasta filata cheese using a single auger extruder housed in a barrel formed with curved, angular sections reduces fat loss from 1-5%, or from 5-10%, or from 10-15%, or from 15-20%, or from 20-25%, or from 25-30%, or from 30-35%, or from 35-40%, or from 40-45%, or from 45-50%, or from 50-55%, or from 55-60%, or from 60-65%, or from 65-70%, or from 70-75%, or from 75-80%, or from 80-85%, or from 85-90%, or from 90-95%.

In one embodiment, extruding pasta filata cheese using a single auger extruder housed in a barrel formed with curved, angular sections reduces fat loss from 5-50% or from 5-35%, or from 5-25%, or from 5-20%, or from 5-15%.

In one embodiment, extruding pasta filata cheese using a single auger extruder housed in a barrel formed with curved, angular sections reduces fat loss by at least 3%, or by at least 5%, or by at least 10%, or by at least 15%, or by at least 20%, or by at least 25% by at least 30%, or by at least 35%.

In one embodiment, extruding pasta filata cheese using a single auger extruder housed in a barrel formed with curved, angular sections increases efficiency of cheese production by at least 3%, or by at least 5%, or by at least 10%, or by at least 15%, or by at least 20%, or by at least 25% by at least 30%, or by at least 35%, or by at least 40%.

In one embodiment, the disclosure relates to a method comprising extruding pasta filata cheese using an auger housed in a barrel as disclosed herein, wherein the barrel is surround by a jacket that creates a gap between the barrel and the jacket; and flowing heated water through the gap between the barrel and the jacket.

The methods disclosed herein can be used to produce any of the traditional cheeses broadly described as pasta filata cheeses. The cheeses made by the methods disclosed herein will replicate the flavor, functionality and appearance of traditional cheeses of these types.

IV. System for Making Pasta Filata Cheese

In one embodiment, a system for making pasta filata cheese includes (1) a cooker, (2) an extruding machine, and (3) optionally, a forming head. In addition, the system can include a cyclone, a curd mill, a conveyance system, an ingredient dispenser, a clean-in-place system.

A. Cyclone

A system for producing pasta filata cheese is disclosed. A cyclone is used to receive cheese curds. In one embodiment, the cheese curds are transported to the cyclone through a tubular structure. The cyclone can be made of any suitable material including but not limited to stainless steel.

B. Curd Mill

In one embodiment, the cheese cured moves from the cyclone to a curd mill. However, a curd mill is not required for in every system.

A curd mill may be used to reduce the size of the curd exiting the cyclone. In another embodiment, the curd may be milled prior to being transported to the cyclone. In still another embodiment, a method known as "stirred curd" may be implemented whereby curds are continuously stirred on the whey draining machine so that milling is not required.

In one embodiment, the curd mill 25 cuts the cheese to a pre-determined and desired size. Representative sizes include but are not limited to ⅜"×⅜"×4"; ¾"×¾"×2" and many other sizes.

C. Conveyance System

The cheese curd leaves the curd mill and is placed on a mechanical belt system. In one embodiment, cheese curd from the curd mill is deposited onto a section of conveyor belt, designed to give the curd mass a specific width, length, and height. This conveyor belt may have cleats across its width and may have elevated sides to contain the curd.

In one embodiment, the system can include at least one conveyance system for transporting the articles through one or more of the processing zones described herein. Examples of suitable conveyance systems can include, but are not limited to, plastic or rubber belt conveyors, chain conveyors, roller conveyors, flexible or multi-flexing conveyors, wire mesh conveyors, bucket conveyors, pneumatic conveyors, screw conveyors, trough or vibrating conveyors, and combinations thereof. The conveyance system can include any number of individual convey lines and can be arranged in any suitable manner within the process vessels. The conveyance system can be configured in a generally fixed position within the vessel or at least a portion of the system can be adjustable in a lateral or vertical direction.

The mechanical belt system is used to transport the cheese from one station to the next station in the system. The cheese curd can be transported on the belt at a rate selected from the group consisting of: 5-10 in/min, 10-15 in/min, 15-20 in/min, 20-25 in/min, 25-30 in/min, 30-35 in/min, 35-40 in/min, 40-45 in/min, 45-50 in/min, 50-55 in/min, 55-60 in/min, 60-65 in/min, 65-70 in/min, 70-75 in/min, 75-80 in/min, 80-85 in/min, 85-90 in/min, 90-95 in/min, 95-100 in/min and greater than 100 in/min (see discussion above for complete range).

D. Ingredient Dispenser

The mechanical belt transports the cheese curd from the mill to an ingredient dispenser. Various ingredients known to the cheese-making art may be added to achieve the optimum characteristics in the final cheese. Examples of such ingredients include but are not limited to non-fat dry milk, anhydrous milk fat, milk protein concentrate, concentrated milk fat, emulsifier, salt, water, and other ingredients as allowed by current or future standards, and mixtures thereof. For example, addition of non-fat dry milk solids lowers the fat content of the cheese, based on the desired specifications of the finished cheese. Adding non-fat dry milk solids is one way to standardize the fat content of the cheese and to capture more of the nonfat solids. The cheese curd takes up re-hydrated nonfat dry milk more easily and the final cheese avoids watering-off. The fat and water content of the incoming cheese and of the desired final cheese determine the amounts of such ingredients to be added. Often, these ingredients may be functionally interchangeable, and the particular added ingredient may vary according to the desired characteristics of the cheese product and according to the market availability and cost of these ingredients.

If desired, a suitable emulsifier may be added to the curd before it is cooked in the continuous cooker stretcher system. In another embodiment, the emulsifier may be added prior to entering the continuous cooker stretcher system, after exiting the continuous cooker stretcher system or before entering the continuous cooker stretcher system and after exiting the continuous cooker stretcher system.

Non-limiting examples of suitable emulsifiers include sodium citrate and sodium phosphate, in amounts of between less than about 0.5% to about 3% (the maximum amount allowed by law). If the curd has the correct fat and moisture content when introduced into the continuous cooker stretcher system, an emulsifier is generally unnecessary. However, to meet certain customer needs, it may be desirable to adjust the moisture or add additional ingredients to the cheese. In addition, an emulsifier avoids watering-off of the mozzarella, by allowing absorption of added water. When an emulsifier, such as sodium citrate, is added, it is preferably added in a level under 0.5%.

Traditional mozzarella preparation typically uses thermophilic cultures and such cultures may be used in the methods disclosed herein.

Additional examples of ingredients include but are not limited to acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Acidity regulators, anticaking agents and firming agents of various types can be included in the soft or firm/semi-hard ripened or unripened blended cheese. Typically, these agents are inorganic salts, but other types of acidity regulators, anticaking agents and firming agents can also be used. Examples of suitable acidity regulators, anticaking agents and firming agents may include calcium chloride, tricalcium phosphate, and calcium hydroxide, powdered cellulose, disodium phosphate and potassium hydroxide. These agents are typically added as part of a solution, either by incorporation in the slurry or as a liquid. But they can also be added as a powder that is incorporated, for example, into the admixture of the slurry and heated cheese mass at the mixing stage.

The total amount of acidity regulators, anticaking agents and firming agents incorporated is sufficient so the concentration of the acidity regulators, anticaking agents and firming agents in the final cheese product is generally up to about 0.01, 0.5, or 3.0% by weight. More specifically, the amount of acidity regulators, anticaking agents and firming agents can range from about 0.05-3.0%, from about 0.1-2.5%, or from about 0.5-2.0% by weight. This means that the concentration of the acidity regulators, anticaking agents and firming agents in the slurry is typically about 0.01-3.2 wt. %.

A number of different sequestrants can be incorporated into the final cheese product. Sequestrants that can be utilized include, but are not limited to, various phosphate salts (e.g., sodium hexametaphosphate, monosodium phosphate, sodium tripolyphosphate, disodium phosphate, and potassium phosphate), calcium citrate, trisodium citrate, calcium gluconate, oxystearin and sorbitol.

The total amount of sequestrant is usually up to about 0.1, 1, or 4% by weight of the final cheese product. So, for example, the amount of sequestrant in the final cheese product can range from about 0.1 to 4%, from about 0.25 to 3.0%, or from about 0.4 to 2.5% by weight. The concentration of the sequestrants in the slurry itself is typically about 0.1 to about 12% by weight of the slurry.

An acidic agent (an acid) can be incorporated to adjust the pH of the finished cheese to a desired level. The acidity of the cheese can be controlled to help regulate the melt down characteristics of the finished cheese. Various acids can be employed; examples of suitable acids include, but are not limited to, adipic acid, lactic acid, hydrochloric acid, acetic acid, glucano delta lactone, phosphoric acid, lactobionic acid or Genlac C, the latter being a blend of water, citric acid, lactic acid, acetic acid and artificial flavors. Acid is typically added to adjust the pH of the finished cheese to a pH from about 5-6 is reached, and more typically from pH 5.10-5.90.

A colorant can be incorporated into the soft or firm/semi-hard ripened or unripened blended cheese to adjust its natural color. This can be useful, for example, if consumers have a preference for a color other than the naturally-occurring color. Examples of suitable colorants include annatto, tumeric, titanium dioxide, and beta-carotene. Colorants may be of both the natural or artificial color. If one wished to color the cheese a red, an artificial color such as FD&C red #40 can be used. Annatto is useful to give mozzarella cheese the appearance of cheddar. This allows one to produce a cheese for pizza baking that has the desired melt characteristics of mozzarella, but with a different appearance than that of traditional white mozzarella. Annatto-colored mozzarella can be used as a replacement for cheddar cheese in many food products (e.g., Mexican-style prepared foods). Tumeric imparts a yellowish color to cheese. The yellowish color often is preferred by consumers who perceive it to indicate a "richer" product upon cooking on a pizza. Colorants such as annatto and tumeric can be obtained, for example, from Chris Hansens Labs of Milwaukee, Wis.

Various flavoring agents can also be incorporated into the cheese to tailor the flavor profile of the cheese to meet consumer preferences. Suitable flavors for mixing into the heated cheese include, for example, cheddar cheese flavor and parmesan cheese flavor. Flavoring agents are typically added in an amount such that the concentration in the final cheese product is within the range of about 0.01 to 5 wt. %. If incorporated into the slurry, the concentration of the flavoring agent in the slurry is generally is in the range of about 0.11-4.50 wt. %.

E. Cooker/Stretcher

The mechanical belt system transports the cheese curd from the ingredient dispenser to a continuous cooker stretcher. The cooker stretcher may be selected based on volume and throughout.

F. Extruder

The single auger extruder is as described in the sections above.

V. General Procedure for Production of Cheese Curd

A general and representative procedure for the production of cheese curd is provided below. The information below is not intended to limit the scope of the application in any manner.

Starting from cow's milk or buffalo milk, or mixed milk having a 0-10% fat content and 2.5-5% protein content, after filtration, the milk is optionally pasteurized following usual procedures or submitted to ultrafiltration, microfiltration and other similar procedures. Once the milk source characteristics have been determined, the milk is brought to a temperature of 33°-37° C. Then the addition of cultures of bacteria and/or selected ferments is carried out, which operation generally takes place 20-30 minutes before the addition of rennet so as to give the milk a mass of very active microorganisms that can give fermentation the desired orientation at once.

Generally, cultures of bacteria mainly consisting of Streptococcus thermophilus and a minor part of *Lactobacillus helvetitus* or *Lactobacillus bulgaricus* are used. The acidity of said bacteria cultures added to the milk at the rate of 2-3%, ranges from 14° to 24° SH/50 ml. It is however also possible to act in such a manner that the acidifying action carried out by milk ferments is replaced by the addition of organic acids to the milk. This addition must take place in such a way to avoid concentration gradients that can give rise to the formation of flocculations. It is therefore suitable to undertake a slow addition of acids suitably diluted in water to the milk remaining under constant and quick stirring. Acetic acid or citric acid may be considered as appropriate and the pH value ranges from 5.5 to 5.8.

Next, to the milk thus obtained, rennet of various titre and characteristics and in variable doses is then added. Curdling takes place at a temperature of about 33°-37° C., it requires a period of time of about 45 minutes and enables a soft but elastic curd to be achieved. In any case, rennet amount and curdling temperature and time may vary depending on the milk characteristics and on the particular features to be achieved in the finished product.

After the soft gel (curd) hardening step, the curd can be cut. The first cutting together with a short rest (5 to 10 minutes) enables the whey drain off to start. Then there is a second cutting. The final result is a curd suspension consisting of grains of variable size depending upon the desired final product. Eventually, the curd may be allowed to settle on the cheese vat bottom in order to enable it "to build itself up" and start ripening. Depending on type of vat, the curd may be continuously stirred to prevent the curd from combining into large lumps.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. The disclosures of patents, references and publications cited in the application are incorporated by reference herein.

What is claimed is:

1. A system comprising:
   a barrel, the barrel comprising a length, a width, an inlet, an outlet, an interior chamber, and a plurality of angular outer wall elements, each angular outer wall element comprising a first sidewall portion, a second sidewall portion, and a curved bottom base;
   wherein each first sidewall portion is welded directly to a second sidewall portion along the entire length of the barrel to form a plurality of continuous and smooth edged ribs that are free of crevices, each rib extending from the inlet to the outlet and protruding inward toward a central axis within the interior chamber of the barrel;
   wherein the barrel comprises a middle flange positioned midway between the inlet and the outlet, wherein the middle flange is only welded at the ribs;
   an auger, wherein at least a portion of the auger is positioned between the inlet and the outlet of the barrel; and
   a jacket, wherein the jacket surrounds the barrel.

2. The system of claim 1, wherein the angular wall elements are composed of a material selected from the group consisting of stainless steel, steel and aluminum.

3. The system of claim 2, wherein the material is stainless steel.

4. The system of claim 1, wherein the first sidewall portion coincides with a first sidewall axis and the second sidewall portion coincides with a second sidewall axis, and wherein the first and second sidewall axes extend to intersect at a vertex to form a central angle of about 15° to about 25°.

5. The system of claim 1, wherein the first sidewall portion coincides with a first sidewall axis and the second sidewall portion coincides with a second sidewall axis, and wherein the first and second sidewall axes extend to intersect at a vertex to form a central angle of 20°.

6. The system of claim 1, wherein the jacket is positioned such that a gap exists between the jacket and the barrel, wherein the gap comprises at least ⅜ inches.

7. The system of claim 6, wherein the jacket comprises a water inlet configured to allow water to flow through the gap between the jacket and the barrel.

8. The system of claim 1, wherein the barrel comprises at least six angular outer wall elements.

9. The system of claim 7, wherein the system further comprises a hopper element, wherein the hopper element is connected to the barrel inlet.

10. A method of preparing pasta filata cheese using the system of claim 9, comprising inputting a dairy product into the hopper element and collecting a processed dairy product from the barrel outlet.

11. The method of claim 10, further comprising flowing water through the gap between the jacket and the barrel at a flow rate of about 15 to about 25 gallons per minute.

* * * * *